Patented July 19, 1938

2,124,331

UNITED STATES PATENT OFFICE 2,124,331

STABLE COLLOIDAL DISPERSION OF METALS

Max Bockmühl, Eugen Dörzbach, and Walther Persch, Frankfort-on-the-Main-Höchst, Germany, assignors to Winthrop Chemical Company, Inc., New York, N. Y., a corporation of New York No Drawing. Application December 11, 1936, Serial No. 115,442. In Germany December 18, 1935

5 Claims. (Cl. 252—6)

The present invention relates to stable colloidal dispersions of metals, more particularly to stable colloidal dispersions of bismuth, silver and gold.

We have found that stable and colloidal dispersions of metals, especially of bismuth, silver and gold, may be prepared by simultaneously adding a water-soluble alkyl cellulose or a derivative thereof and a water-soluble salt of lysalbinic acid or protalbinic acid or salts of both acids. As water-soluble alkyl celluloses there may be used, for instance, methyl cellulose, ethyl cellulose, hydroxyethyl cellulose or hydroxyethylmethyl cellulose. As water-soluble salts of lysalbinic acid or protalbinic acid there may especially be used the sodium salt. In this manner, there may, for instance, be prepared a stable aqueous dispersion containing about 0.33 per cent of colloidal bismuth, by using an addition of about 0.2 per cent of a water-soluble alkyl-cellulose, for instance hydroxymethyl cellulose, about 0.1 per cent of sodium protalbinate and about 0.1 per cent of sodium lysalbinate as dispersing agents.

Whereas the alkyl celluloses or the salts of lysalbinic acid or protalbinic acid per se do not form in many cases permanently stable colloidal dispersions of metals, it is possible by this invention to obtain colloidal dispersions of metals which are stable for a year and more. Of course there must be observed during the preparation and the storage of the colloidal dispersion of a metal obtained by the process of the invention the precautions necessary for this class of bodies.

The following examples serve to illustrate the invention but they are not intended to limit it thereto:

1.—2.75 cc. of a bismuth-ammonium-citrate-solution which is freed from ammonia to a very large extent and contains 6 per cent of bismuth are slowly introduced, while stirring, into a mixture of 25 cc. of a solution of 0.1 per cent of sodium lysalbinate and 0.1 per cent of sodium protalbinate and 25 cc. of a hydroxyethylmethyl cellulose solution of the viscosity 3. The solution is reduced at 50° C. in a nitrogen atmosphere and while nitrogen is caused to pass through the solution in the form of bubbles, by means of glucose or sodium hydrosulfite or formaldehyde. The colloidal dispersion obtained is precipitated with alcohol and ether and the precipitate is dissolved in water.

2.—1.0 gram of silver nitrate is dissolved in 3 cc. of water and an excess of a triethanolamine solution of 30 per cent strength is added; the solution obtained is then mixed with 25 cc. of a hydroxyethylmethyl cellulose solution of the viscosity 1.25 and 25 cc. of a solution containing 0.1 per cent of sodium lysalbinate and 0.1 per cent of sodium protalbinate. The whole is heated to about 70° C. The colloidal dispersion obtained is either precipitated with alcohol and ether and then redissolved in water or precipitated with dilute hydrochloric acid, washed with water and redissolved in a feebly alkaline water.

3.—0.5 gram of auric chloride is dissolved in 5 cc. of water, an excess of triethanolamine solution of 30 per cent strength is added and the solution obtained is mixed with 50 cc. of a neutral methyl cellulose solution of the viscosity 1.5 and 25 cc. of a solution of 0.1 per cent strength of sodium lysalbinate and a solution of 0.1 per cent strength of sodium protalbinate. After the whole has been reduced at 70° C. the colloidal dispersion is precipitated with alcohol and ether and dissolved in water.

We claim:

1. A stable aqueous colloidal dispersion of a metal of the group consisting of bismuth, silver and gold containing at least one water-soluble compound of the group consisting of methyl cellulose, ethyl cellulose, hydroxyethyl cellulose, hydroxyethylmethyl cellulose and at least one alkali salt of the acids of the group consisting of protalbinic acid and lysalbinic acid.

2. A stable aqueous colloidal dispersion of a metal of the group consisting of bismuth, silver and gold containing sodium protalbinate and at least one water-soluble compound of the group consisting of methyl cellulose, ethyl cellulose, hydroxyethyl cellulose, hydroxyethyl-methyl cellulose.

3. A stable aqueous colloidal dispersion of a metal of the group consisting of bismuth, silver and gold containing sodium lysalbinate and at least one water-soluble compound of the group consisting of methyl cellulose, ethyl cellulose, hydroxyethyl cellulose, hydroxyethyl-methyl cellulose.

4. A stable aqueous colloidal dispersion of bismuth containing hydroxyethyl cellulose, sodium lysalbinate and sodium protalbinate.

5. A stable aqueous colloidal dispersion containing about 0.33 per cent of colloidal bismuth, about 0.2 per cent of hydroxyethylmethyl cellulose, about 0.1 per cent of sodium protalbinate and 0.1 per cent of sodium lysalbinate.

MAX BOCKMÜHL.
EUGEN DÖRZBACH.
WALTHER PERSCH.